United States Patent Office.

HEINRICH AUGUST BERNTHSEN, OF MANNHEIM, AND PAUL JULIUS, OF LUDWIGSHAFEN, ASSIGNORS TO THE BADISCHE ANILIN AND SODA FABRIK, OF LUDWIGSHAFEN, GERMANY.

AZO ORANGE DYE.

SPECIFICATION forming part of Letters Patent No. 545,333, dated August 27, 1895.

Application filed April 11, 1895. Serial No. 545,396. (Specimens.) Patented in Germany October 8, 1893, No. 80,973, and in France May 7, 1894, No. 238,340.

*To all whom it may concern:*

Be it known that we, HEINRICH AUGUST BERNTHSEN, doctor of philosophy, a subject of the King of Prussia, residing at Mannheim, and PAUL JULIUS, doctor of philosophy, a subject of the Emperor of Austria, residing at Ludwigshafen-on-Rhine, Germany, have invented new and useful Improvements in the Manufacture of New Azo Coloring-Matter, (for which patents have been obtained in Germany, No. 80,973, dated October 8, 1893, and in France, by brevet, No. 238,340, dated May 7, 1894, and certificate of addition October 20, 1894,) of which the following is a specification.

Our invention relates to the production of new coloring-matter which is of a brilliant orange color and which dyes cotton without the aid of a mordant, giving shades which are characterized by great fastness against the action of acids, washing, and light. The said coloring-matter belongs to the class of the disazo-dyes and is obtainable by the combination of the tetrazo-compound of benzidine-disulfoacid with nitro-meta-phenylene-diamin (see *Berichte der Deutschen Chemischen Gesellschaft*, 7, 1257,) or nitro-meta-toluylene-diamine (ibid., Vol. 3, pages 9 and 319) bases, which prior to our invention have not been industrially applied. The products obtained from these two homologues are so similar as to be practically identical.

The chemical constitution of the new dye is indicated by the following scheme:

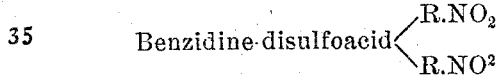

where R stands for the residue of meta-phenylene or toluylene-diamine.

In the following we describe the production of the coloring-matter from benzidine-disulfoacid and nitro-meta-phenylene-diamin as an example of the manner in which the invention can best be carried into practical effect. The parts are, by weight—

Example: Dissolve about thirty-four and a half (34½) parts of benzidine-disulfoacid in about two hundred (200) parts of water containing the requisite quantity of alkali, and add when cold [fifteen to twenty degrees centigrade (15—20° C.)] about fourteen (14) parts of sodium nitrite dissolved in about two hundred (200) parts of water, next pour the mixture into about one hundred and sixty (160) parts of hydrochloric acid [containing about thirty per cent. (30%) real acid HCl] diluted with about three (3) times the quantity of water. Stir well while mixing and continuously for five (5) hours, then add a solution containing about thirty-two (32) parts nitro-meta-phenylene-diamin, fifty-eight (58) parts hydrochloric acid, [thirty per cent. (30%) HCl,] and two hundred (200) parts of water. This solution should be at a temperature of about fifty degrees centigrade, (50° C.,) so that the whole mixture has a temperature of forty to fifty degrees centigrade, (40—50° C.) Next add about one hundred and twelve (112) parts of sodium acetate dissolved in about three hundred and thirty-six (336) parts of water. Stir the mixture for three (3) hours longer at this temperature, and then add gradually a solution of about one hundred and seventy (170) parts calcined soda in about one thousand (1,000) parts water, then stir continuously for twenty-four (24) hours. Filter, press, and dry.

Our new coloring-matter occurs as a dark reddish-brown powder with a slight greenish luster, readily soluble in hot and cold water and soluble in ordinary alcohol. It dissolves in concentrated sulfuric acid, giving a yellow-red solution, and is particularly characterized by its behavior toward soda solution and dilute sulfuric acid. If a solution of one part coloring-matter in one thousand parts of water be treated with about one-tenth of its volume of soda solution (one part of soda in eight parts of water) a copious precipitate of the coloring-matter will separate from solution almost immediately; also if a similar aqueous solution of the coloring-matter be treated with a little dilute sulfuric acid a deep orange precipitate is formed.

Now, what we claim is—

The new coloring matter which can be obtained by the combination of the tetrazo-compound of benzidin-disulfoacid with a nitro diamin such as nitro-meta-phenylene-diamin and which occurs as a dark reddish brown powder soluble in water and which is precipitated from its aqueous solution by soda solution and yields a deep orange precipitate from its aqueous solution on the addition of dilute sulfuric acid, all substantially as described.

In testimony whereof we have hereunto set our hands in the presence of two subscribing witnesses.

HEINRICH AUGUST BERNTHSEN.
PAUL JULIUS.

Witnesses:
ERNEST F. EHRHARDT,
CARL LUDWIG MÜLLER.